United States Patent [19]
Morinaga et al.

[11] Patent Number: 5,705,254
[45] Date of Patent: Jan. 6, 1998

[54] PLASTIC MOLDED ARTICLE WITH A FINISHED SURFACE APPEARANCE

[75] Inventors: Hisakazu Morinaga, Yamato; Shoichi Shimura; Kazutaka Takeuchi, both of Yokohama, all of Japan

[73] Assignee: Canon Kabushiki Kaisha, Tokyo, Japan

[21] Appl. No.: 705,279

[22] Filed: Aug. 29, 1996

Related U.S. Application Data

[63] Continuation of Ser. No. 400,886, Mar. 8, 1995, abandoned.

[30] Foreign Application Priority Data

| | | | |
|---|---|---|---|
| Mar. 10, 1994 | [JP] | Japan | 6-039468 |
| Jul. 29, 1994 | [JP] | Japan | 6-177952 |
| Feb. 16, 1995 | [JP] | Japan | 7-028183 |

[51] Int. Cl.$^6$ .............................. B32B 3/30; B24C 45/26
[52] U.S. Cl. .................. 428/141; 428/156; 428/338; 428/220; 264/299; 264/219; 264/400; 219/121.69; 219/121.68
[58] Field of Search .............................. 428/141, 156, 428/338, 220; 264/294, 219, 400; 219/121.64, 121.68

[56] References Cited

U.S. PATENT DOCUMENTS

| | | | |
|---|---|---|---|
| 4,544,578 | 10/1985 | Duane, Jr. | 427/140 |
| 4,965,430 | 10/1990 | Curtis et al. | 219/121.69 |

FOREIGN PATENT DOCUMENTS

| | | | |
|---|---|---|---|
| 0311079 | 12/1989 | European Pat. Off. | |
| 55-15888 | 2/1980 | Japan | |

OTHER PUBLICATIONS

"Tool Engineer", Monthly Magazine for Manufacturing Engineers, pp. 76–81 (Mar. 1993).

"Die & Mould Technology", vol. 8, No. 3, pp. 69–73 (Mar. 1993).

*Primary Examiner*—William Watkins
*Attorney, Agent, or Firm*—Fitzpatrick, Cella, Harper & Scinto

[57] ABSTRACT

A plastic molded article has an external appearance of a coated article and is formed by injection molding using a mold with a surface shaped by forming machining marks in the form of recesses over the entire mold surface. The resulting plastic molded article has a center line average roughness of the surface shaped of the plastic molded article less than 0.5 μm and one of either an average slope within the range of 1.0~10.0° or an average peak-to-peak interval within the range of 5.0–30.0 μm.

6 Claims, 26 Drawing Sheets

FIG. 3

COMPARISON OF PLASTIC MOLDED ARTICLE ACCORDING TO EXAMPLE 1
AND METAL SUBJECTED TO SATIN BLACK ANODIZED ALUMINUM TREATMENT

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| METAL SUBJECTED TO SATIN BLACK ANODIZED ALUMINUM TREATMENT | Ra<br>Δq<br>S | 1.32 (μm)<br>9.43 (°)<br>27.1 (μm) | 2120 | 15.7 |
| INNER SURFACE OF MOLD USED IN EXAMPLE 1 | Ra<br>Δq<br>S | 1.33 (μm)<br>9.00 (°)<br>30.1 (μm) | — | — |
| PLASTIC MOLDED ARTICLE ACCORDING TO EXAMPLE 1 | Ra<br>Δq<br>S | 1.33 (μm)<br>8.45 (°)<br>33.4 (μm) | 2090 | 16.3 |

FIG. 4

COMPARISON OF PLASTIC MOLDED ARTICLE ACCORDING TO EXAMPLE 2 AND METAL SUBJECTED TO SATIN BLACK ANODIZED ALUMINUM TREATMENT

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| METAL SUBJECTED TO SATIN BLACK ANODIZED ALUMINUM TREATMENT | Ra<br>Δq<br>S | 0.58 (μm)<br>5.26 (°)<br>20.9 (μm) | 1720 | 20.1 |
| INNER SURFACE OF MOLD USED IN EXAMPLE 2 | Ra<br>Δq<br>S | 0.58 (μm)<br>5.19 (°)<br>12.4 (μm) | — | — |
| PLASTIC MOLDED ARTICLE ACCORDING TO EXAMPLE 2 | Ra<br>Δq<br>S | 0.58 (μm)<br>5.11 (°)<br>13.4 (μm) | 1810 | 21.2 |

FIG. 5

COMPARISON OF PLASTIC MOLDED ARTICLE ACCORDING TO EXAMPLE 3 AND METAL SUBJECTED TO SATIN SILVER ANODIZED ALUMINUM TREATMENT

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| METAL SUBJECTED TO SATIN SILVER ANODIZED ALUMINUM TREATMENT | Ra<br>Δq<br>S | 1.97 (μm)<br>10.7 (°)<br>45.4 (μm) | 7190 | 6.5 |
| INNER SURFACE OF MOLD USED IN EXAMPLE 3 | Ra<br>Δq<br>S | 1.90 (μm)<br>12.7 (°)<br>44.9 (μm) | — | — |
| PLASTIC MOLDED ARTICLE ACCORDING TO EXAMPLE 3 | Ra<br>Δq<br>S | 1.88 (μm)<br>12.6 (°)<br>44.5 (μm) | 7010 | 6.9 |

MAIN BODY COVER

FIG. 7

COMPARISON OF PLASTIC MOLDED ARTICLE ACCORDING TO EXAMPLE 4
AND BLACK-COATED ARTICLE

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE: 85°) |
|---|---|---|---|---|
| PLASTIC MOLDED ARTICLE ALREADY SUBJECTED TO BLACK COATING TREATMENT | Ra<br>Δq<br>S | 0.20 (μm)<br>2.01 (°)<br>21.1 (μm) | 790 | 58.9 |
| INNER SURFACE OF MOLD USED IN EXAMPLE 4 | Ra<br>Δq<br>S | 0.19 (μm)<br>1.99 (°)<br>20.9 (μm) | — | — |
| PLASTIC MOLDED ARTICLE ACCORDING TO EXAMPLE 4 | Ra<br>Δq<br>S | 0.19 (μm)<br>1.71 (°)<br>20.3 (μm) | 730 | 60.5 |

FIG. 8

COMPARISON OF PLASTIC MOLDED ARTICLE ACCORDING TO EXAMPLE 5
AND BLACK-COATED ARTICLE

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| PLASTIC MOLDED ARTICLE ALREADY SUBJECTED TO BLACK COATING TREATMENT | Ra<br>Δq<br>S | 0.10 (μm)<br>1.13 (°)<br>8.33 (μm) | 532 | 80.1 |
| INNER SURFACE OF MOLD USED IN EXAMPLE 5 | Ra<br>Δq<br>S | 0.11 (μm)<br>1.26 (°)<br>6.12 (μm) | — | — |
| PLASTIC MOLDED ARTICLE ACCORDING TO EXAMPLE 5 | Ra<br>Δq<br>S | 0.11 (μm)<br>1.33 (°)<br>6.21 (μm) | 525 | 79.8 |

FIG. 9

COMPARISON OF PLASTIC MOLDED ARTICLE ACCORDING TO EXAMPLE 6 AND SILVER-COATED ARTICLE

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| PLASTIC MOLDED ARTICLE ALREADY SUBJECTED TO SILVER COATING TREATMENT | Ra<br>Δq<br>S | 0.43 (μm)<br>9.93 (°)<br>27.3 (μm) | 3920 | 55.5 |
| INNER SURFACE OF MOLD USED IN EXAMPLE 6 | Ra<br>Δq<br>S | 0.42 (μm)<br>14.5 (°)<br>28.0 (μm) | — | — |
| PLASTIC MOLDED ARTICLE ACCORDING TO EXAMPLE 6 | Ra<br>Δq<br>S | 0.42 (μm)<br>14.5 (°)<br>27.7 (μm) | 4010 | 51.9 |

FIG. 11

COMPARISON OF PLASTIC MOLDED ARTICLE ACCORDING TO EXAMPLE 7 AND BLACK-PLATED ARTICLE

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE: 85°) |
|---|---|---|---|---|
| PLASTIC MOLDED ARTICLE ALREADY SUBJECTED TO BLACK PLATING TREATMENT | Ra<br>Δq<br>S | 0.066 (μm)<br>1.31 (°)<br>9.55 (μm) | 165 | 91.3 |
| INNER SURFACE OF MOLD USED IN EXAMPLE 7 | Ra<br>Δq<br>S | 0.068 (μm)<br>1.30 (°)<br>9.44 (μm) | — | — |
| PLASTIC MOLDED ARTICLE ACCORDING TO EXAMPLE 7 | Ra<br>Δq<br>S | 0.068 (μm)<br>1.25 (°)<br>9.32 (μm) | 150 | 90.5 |

FIG. 12

COMPARISON OF PLASTIC MOLDED ARTICLE ACCORDING TO EXAMPLE 8 AND BLACK-PLATED ARTICLE

| MATERIAL MEASURED | SURFACE ROUGHNESS (FEELER-TYPE SURFACE ROUGHNESS MEASURING DEVICE) | | BRILLIANCE (%·nm) | GLOSS VALUE (%) (ANGLE OF INCIDENCE: 85°) |
|---|---|---|---|---|
| PLASTIC MOLDED ARTICLE ALREADY SUBJECTED TO BLACK PLATING TREATMENT | Ra<br>Δq<br>S | 0.013 (μm)<br>1.14 (°)<br>5.55 (μm) | 92 | 98.3 |
| INNER SURFACE OF MOLD USED IN EXAMPLE 8 | Ra<br>Δq<br>S | 0.014 (μm)<br>1.28 (°)<br>2.11 (μm) | — | — |
| PLASTIC MOLDED ARTICLE ACCORDING TO EXAMPLE 8 | Ra<br>Δq<br>S | 0.013 (μm)<br>1.25 (°)<br>2.46 (μm) | 79 | 92.2 |

FIG. 13

COMPARISON OF PLASTIC MOLDED ARTICLE ACCORDING TO EXAMPLE 9
AND SILVER-PLATED ARTICLE

| MATERIAL MEASURED | SURFACE ROUGHNESS (FEELER-TYPE SURFACE ROUGHNESS MEASURING DEVICE) | | BRILLIANCE (%·nm) | GLOSS VALUE (%) (ANGLE OF INCIDENCE: 85°) |
|---|---|---|---|---|
| PLASTIC MOLDED ARTICLE ALREADY SUBJECTED TO SILVER PLATING TREATMENT | Ra<br>Δq<br>S | 0.098 (μm)<br>0.98 (°)<br>6.33 (μm) | 1312 | 87.2 |
| INNER SURFACE OF MOLD USED IN EXAMPLE 9 | Ra<br>Δq<br>S | 0.092 (μm)<br>0.89 (°)<br>6.45 (μm) | — | — |
| PLASTIC MOLDED ARTICLE ACCORDING TO EXAMPLE 9 | Ra<br>Δq<br>S | 0.094 (μm)<br>0.93 (°)<br>6.55 (μm) | 1309 | 75.9 |

FIG. 14

COMPARISON OF PLASTIC MOLDED ARTICLE ACCORDING TO EXAMPLE 10
AND BLACK-COATED ARTICLE (ABS RESIN)

| MATERIAL MEASURED | SURFACE ROUGHNESS (FEELER-TYPE SURFACE ROUGHNESS MEASURING DEVICE) | | BRILLIANCE (%·nm) | GLOSS VALUE (%) (ANGLE OF INCIDENCE: 85°) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| BLACK PLASTIC PLATE (COATED ARTICLE) USED IN EXAMPLE 10 | Ra<br>Δq<br>S | 0.20 (μm)<br>2.10 (°)<br>6.88 (μm) | 790 | 72.8 |
| INNER SURFACE OF MOLD USED IN EXAMPLE 10 | Ra<br>Δq<br>S | 0.19 (μm)<br>1.99 (°)<br>3.91 (μm) | — | — |
| PLASTIC MOLDED ARTICLE ACCORDING TO EXAMPLE 10 | Ra<br>Δq<br>S | 0.19 (μm)<br>1.71 (°)<br>3.56 (μm) | 730 | 74.2 |

FIG. 15

COMPARISON OF PLASTIC MOLDED ARTICLE ACCORDING TO EXAMPLE 11
AND BLACK-COATED ARTICLE (ALUMINUM)

| MATERIAL MEASURED | SURFACE ROUGHNESS (FEELER-TYPE SURFACE ROUGHNESS MEASURING DEVICE) | | BRILLIANCE (% · nm) | GLOSS VALUE (%) (ANGLE OF INCIDENCE : 85°) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| BLACK METAL PLATE (COATED ARTICLE) USED IN EXAMPLE 11 | Ra<br>Δq<br>S | 0.33 (μm)<br>8.10 (°)<br>26.4 (μm) | 1110 | 42.4 |
| INNER SURFACE OF MOLD USED IN EXAMPLE 11 | Ra<br>Δq<br>S | 0.31 (μm)<br>15.4 (°)<br>25.4 (μm) | — | — |
| PLASTIC MOLDED ARTICLE ACCORDING TO EXAMPLE 11 | Ra<br>Δq<br>S | 0.29 (μm)<br>16.2 (°)<br>24.8 (μm) | 980 | 44.5 |

FIG. 16

COMPARISON OF PLASTIC MOLDED ARTICLE ACCORDING TO EXAMPLE 12 AND BLACK-COATED ARTICLE (POLYCARBONATE PLATE)

| MATERIAL MEASURED | | SURFACE ROUGHNESS (FEELER-TYPE SURFACE ROUGHNESS MEASURING DEVICE) | BRILLIANCE (% · nm) | GLOSS VALUE (%) (ANGLE OF INCIDENCE : 85°) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| BLACK PLASTIC PLATE (COATED ARTICLE) USED IN EXAMPLE 12 | Ra<br>Δq<br>S | 0.24 (μm)<br>5.11 (°)<br>15.5 (μm) | 850 | 55.3 |
| INNER SURFACE OF MOLD USED IN EXAMPLE 12 | Ra<br>Δq<br>S | 0.23 (μm)<br>5.18 (°)<br>16.2 (μm) | — | — |
| PLASTIC MOLDED ARTICLE ACCORDING TO EXAMPLE 12 | Ra<br>Δq<br>S | 0.25 (μm)<br>5.02 (°)<br>15.9 (μm) | 860 | 55.1 |

FIG. 17

PLASTIC MOLDED ARTICLE ACCORDING TO EXAMPLE 13

| MATERIAL MEASURED | SURFACE ROUGHNESS (FEELER-TYPE SURFACE ROUGHNESS MEASURING DEVICE) | | BRILLIANCE (%·nm) | GLOSS VALUE (%) (ANGLE OF INCIDENCE: 85°) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| INNER SURFACE OF MOLD USED IN EXAMPLE 13 | Ra<br>Δq<br>S | 0.33 (μm)<br>3.25 (°)<br>10.9 (μm) | — | — |
| PLASTIC MOLDED ARTICLE ACCORDING TO EXAMPLE 13 | Ra<br>Δq<br>S | 0.35 (μm)<br>3.33 (°)<br>9.69 (μm) | 2120 | 63.0 |

FIG. 18

| EXAMPLE OF HIGH-QUALITY EXTERNAL APPEARANCE | SURFACE SHAPE (SURFACE ROUGHNESS) | | |
|---|---|---|---|
| | Ra (μm) | Δq (°) | S (μm) |
| SEMBLANCE OF SATIN ANODIZED ALUMINUM TREATMENT | 0.50 ~ 2.00 | 5 ~ 12 | 20 ~ 50 |
| SEMBLANCE OF COATING TREATMENT | 0.01 ~ 0.05 | 1 ~ 10 | 5 ~ 30 |
| SEMBLANCE OF PLATING TREATMENT | 0.01 ~ 0.10 | 1 ~ 2 | 5 ~ 15 |

CENTER-LINE AVERAGE ROUGHNESS Ra

GLOSS VALUE ( ANGLE OF INCIDENCE : 85°)

F I G. 24

| MATERIAL MEASURED | | SURFACE ROUGHNESS | BRILLIANCE (%·nm) | GLOSS VALUE (ANGLE OF INCIDENCE: 85°) (%) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| MOLD SURFACE | Ra<br>Δq<br>S | 0.20 (μm)<br>4.55 (°)<br>20.5 (μm) | — | — |
| SURFACE OF PLASTIC MOLDED PART | Ra<br>Δq<br>S | 0.23 (μm)<br>4.65 (°)<br>21.3 (μm) | 810 | 57 |

F I G. 28

| MATERIAL MEASURED | SURFACE ROUGHNESS | | BRILLIANCE (%·nm) | GLOSS VALUE (%) (ANGLE OF INCIDENCE: 85°) |
|---|---|---|---|---|
| RANGE OF PARTS ALREADY SUBJECTED TO COATING TREATMENT | Ra<br>Δq<br>S | LESS THAN 0.50 (μm)<br>1.0 ~ 10.0 (°)<br>5.0 ~ 30.0 (μm) | — | 40 ~ 80 |
| MOLD SURFACE | Ra<br>Δq<br>S | 0.44 (μm)<br>8.02 (°)<br>25.3 (μm) | — | — |
| SURFACE OF PLASTIC MOLDED PART | Ra<br>Δq<br>S | 0.43 (μm)<br>7.84 (°)<br>27.1 (μm) | 900 | 48 |

PLASTIC MOLDED ARTICLE WITH A FINISHED SURFACE APPEARANCE

This application is a continuation of application Ser. No. 08/400,886, filed Mar. 8, 1995, now abandoned.

BACKGROUND OF THE INVENTION

This invention relates to a plastic molded article which may serve as an ordinary manufactured part as a matter of course but which is particularly well suited for use as an exterior trim part requiring an attractive appearance and excellent feel in a device such as a camera, copier, printer or facsimile machine.

In order to raise the commercial value of a manufactured part, it is of course necessary to improve the functionality of the article such as by improving its operability but it is also important to enhance the visual beauty of the article (as by providing it with a high-quality external appearance) and to provide the article with a pleasant touch. In a mature market such as the camera market, it has become increasingly difficult to distinguish among merchandise by article functionality alone, and therefore more emphasis is being placed upon design in order to make merchandise more distinctive.

A number of methods have been used conventionally to obtain parts having a high-quality external appearance. These known methods include a method of providing a metal surface with a satin finish and subsequently applying an anodized aluminum treatment to acquire a hard, fine external appearance; a so-called coating method of applying various coatings to the surface of molded plastic; and a method of applying a plating treatment to obtain a characteristic surface state.

There is especially great demand for an external appearance obtained by a coating treatment. This is often used in the upper cover, strobe cover and apron of high-end cameras such as the T90, EOS650, EOS620, EOS750, EOS850, EOS1, EOS10, EOS100, EOS1000, EOS1000S manufactured by Canon Inc.

In order to lighten the weight of manufactured articles and improve mass productivity, it has recently become possible to make wide use of injection-molded parts comprising plastic material in manufactured parts for precision instruments such as cameras, manufactured parts for office equipment such as copiers, printers and facsimile machines and trim members for electrical appliances and the like. As mentioned above, finishing the external surfaces of these trim parts to a high quality is important in order to increase the value of these parts.

In case of a device such as a single-lens reflex camera or video camera in which the photographer takes a picture by holding the camera or in which the user ordinarily carries the camera about without putting it into a case, the design of the camera in terms of its external appearance is very important with regard to providing the camera with a high-grade appearance. It is clear that the demand for an article such as a camera can be increased by providing it with a more visually attractive external appearance even if the photographic functionality or exterior shape of the camera body is not particularly distinctive.

In general, cameras, especially single-reflex color cameras, having a black body color are in demand because of their high-quality appearance. Designers take great pains in coating and plating treatments to achieve a high-quality appearance in the color black. Difficulties are also experienced at the factory in connection with the balance between cost in the treatment processes and high-quality appearance. Achieving the color black requires a coating treatment and it is difficult to lower manufacturing cost and the price of manufactured parts.

In the case of devices other than the above-mentioned cameras, such as ultra-small portable tape recorders, personal computers, handy-type cellular telephones and multimedia equipment, a specific appearance tends to be desired depending upon the state in which these devices are used and the particular age group using them.

Furthermore, though it is possible to obtain a hard, fine and high-quality external appearance with the aforementioned anodized aluminum treatment for a satin finish, a problem encountered is that this treatment cannot be applied to a plastic molded article. In addition, the cost of coating treatment and plating treatment is high owing to material costs for binder and pigments needed in coating and labor costs involved in post-treatment. Another problem is that the solvents necessary for these treatments are harmful to the human body and environment.

SUMMARY OF THE INVENTION

Accordingly, an object of the present invention is to provide, at low cost, a plastic molded article exhibiting a high-quality external appearance which does not require any special post-treatment following molding from plastic.

According to a first aspect of the invention, the foregoing object is attained by providing a plastic molded article, which is produced by injection molding, characterized in that an 85° specular gloss value of the article surface is greater than 40% and less than 80%.

According to a second aspect of the invention, the foregoing object is attained by providing a plastic molded article molded by using a mold having a surface shape formed by repeating, a number of times while changing position on the surface, a process of removing a surface layer from the surface of the mold to form machining marks in the form of recesses each having a radius of less than 25 μm until the machining marks occupy the entirety of the surface, wherein the plastic molded article has a surface shape obtained by transfer of the surface shape of the mold.

Other objects and features besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiment of the invention, and therefore reference is made to the claims which follow the description for determining the scope of the invention.

BRIEF DESCRIPTION OF THE DRAWINGS

FIG. 3 is a table showing the surface roughness, brilliance and gloss of a plastic molded article according to a first example of the present invention;

FIG. 4 is a table showing the surface roughness, brilliance and gloss of a plastic molded article according to a second example of the present invention;

FIG. 5 is a table showing the surface roughness, brilliance and gloss of a plastic molded article according to a third example of the present invention;

FIG. 7 is a table showing the surface roughness, brilliance and gloss of a plastic molded article according to a fourth example of the present invention;

FIG. 8 is a table showing the surface roughness, brilliance and gloss of a plastic molded article according to a fifth example of the present invention;

FIG. 9 is a table showing the surface roughness, brilliance and gloss of a plastic molded article according to a sixth example of the present invention;

FIG. 11 is a table showing the surface roughness, brilliance and gloss of a plastic molded article according to a seventh example of the present invention;

FIG. 12 is a table showing the surface roughness, brilliance and gloss of a plastic molded article according to an eighth example of the present invention;

FIG. 13 is a table showing the surface roughness, brilliance and gloss of a plastic molded article according to a ninth example of the present invention;

FIG. 14 is a table showing the surface roughness, brilliance and gloss of a plastic molded article according to a tenth example of the present invention;

FIG. 15 is a table showing the surface roughness, brilliance and gloss of a plastic molded article according to an 11th example of the present invention;

FIG. 16 is a table showing the surface roughness, brilliance and gloss of a plastic molded article according to a 12th example of the present invention;

FIG. 17 is a table showing the surface roughness, brilliance and gloss of a plastic molded article according to a 13th example of the present invention;

FIG. 18 is a table showing examples of high-quality external appearances and their surfaces roughnesses;

FIG. 24 is a table showing the surface roughness, brilliance and gloss of a plastic molded article according to the 14th example of the present invention;

FIG. 28 is a table showing the surface roughness, brilliance and gloss of a plastic molded article according to the 15th example of the present invention.

DESCRIPTION OF THE PREFERRED EMBODIMENTS

Figure 1:
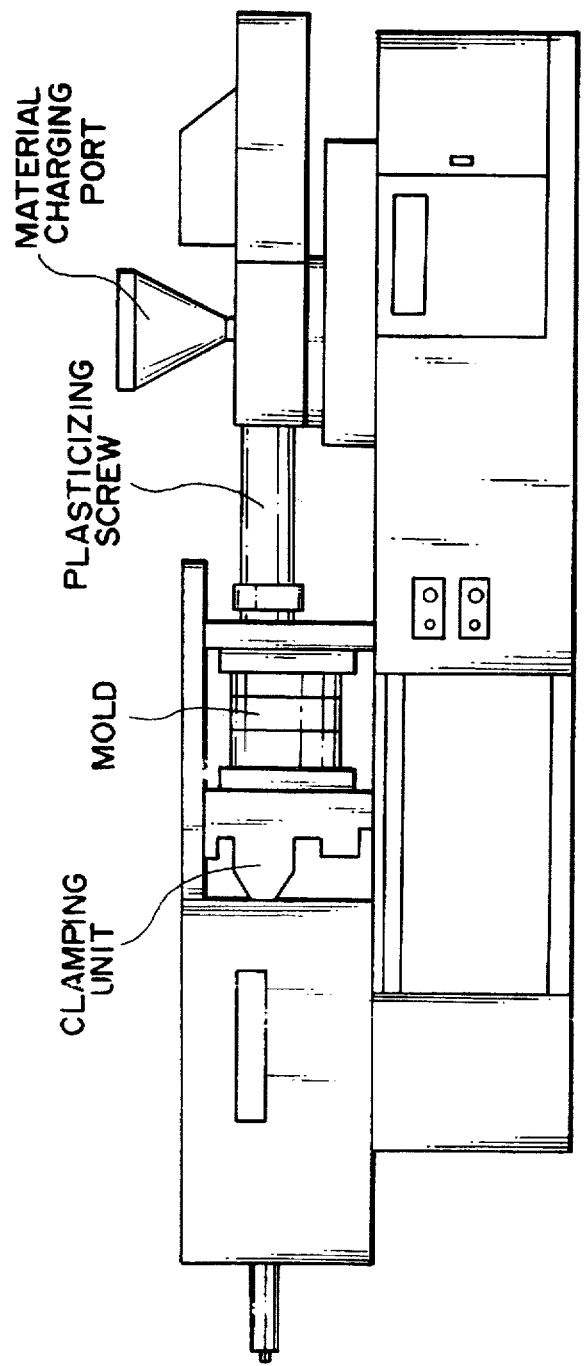
FIG. 1 is an external view showing a molding machine for molding a plastic molded article according to the present invention.

Preferred embodiments of the present invention will be described in detail with reference to the accompanying drawings.

Before describing the details of the embodiments, (1) particulars relating to evaluation of external appearance and (2) parameters relating to surface shape and surface roughness will be discussed.

(1) Particulars relating to evaluation of external appearance

The principal method of evaluating the external appearance of camera parts generally is "visual evaluation", in which the industrial design is judged subjectively by eye. This evaluation involves the following three particulars:

(a) the sensuous impression (e.g., warmth, softness, smoothness) given by "surface state" and "surface shape";

(b) the visual impression (e.g., wetness) given by the "gloss" of the surface; and (c) the visual impression given by the "color" of the substance constituting the surface.

In this embodiment, the following method was used as a method of objectively evaluating the three items mentioned above:

(a) With regard to the sensuous impression given by "surface state" and "surface shape", surface roughness parameters (stipulated by the Industrial Standards ISO 468, JIS B0601) Ra, S, $\Delta$q, described below, were evaluated. In this embodiment, Ra, S, $\Delta$q were measured using a Form Talysurf surface roughness meter manufactured by Rank Taylor Hobson Limited, and a roughness filter (having a cut-off value of 0.25 mm), in accordance with ISO standards, having a stylus with a tip R of 2 µm.

(b) With regard to the visual impression given by the "gloss" of the surface, evaluation was performed by a specular gloss-value measurement method according to ISO 2813 (JIS Z8741). In this embodiment, use was made of a DR LANGE portable reflectometer (manufactured by Moritex K. K.) and evaluation was performed at a measurement angle of 85°.

Furthermore, "specular gloss value" is calculated in accordance with the following equation on the basis of reflective luminous flux $\Psi_s$ from a specimen surface when the surface is irradiated with a luminous flux at a stipulated angle of incidence, and a reflective luminous flux $\Psi_{OS}$ from the standard surface:

$$\text{gloss value } (\%) = (\Psi_s/\Psi_{OS}) \times (\text{specular gloss value of standard surface used})$$

(c) With regard to the visual impression given by the "color" of the substance constituting the surface, this can be expressed objectively by parameters of the three attributes (color, chromaticity and brilliance) of color (JIS Z 8105 . . . terms related to color; JIS Z 8120 . . . optical terminology, etc.).

In this embodiment, however, in order to simplify the description, the solid substance used was limited to a colorless substance and the evaluation of "color" was performed by evaluating brilliance only. The evaluation of brilliance was carried out using a self-recording spectrophotometer (manufactured by Hitachi, Ltd.).

Brilliance is a parameter representing the degree of brightness of a color. In this embodiment, the above-mentioned spectrophotometer was used to evaluate brilliance based upon the integrated value of a spectral reflection curve in the region of visible light. In the case of a substance having color, however, it goes without saying that implementation in a manner equivalent to that of this embodiment is possible by taking the parameters of color and chromaticity into consideration.

(2) Particulars relating to surface shape and surface roughness

Definitions regarding surface shape and surface roughness used in this embodiment are as follows, in accordance with JIS B 0601 (surface roughness), JIS Z 8104 (measurement terminology) and ISO 468:

(1) Center-line average roughness Ra $$Ra = (1/L) \int_0^L |f(x)| dx$$

(2) Average slope $\Delta q$ $$\Delta q = (1/L) \int_0^L |d/dx \cdot f(x)| dx$$

(3) Average peak-to-peak interval S $$S = (S1 + S2 + \ldots + Sn)/n$$

In the foregoing, f(x) represents a cross-sectional curve of surface roughness and L represents measurement reference length.

Examples of equipment for measuring surface shape (surface roughness) include a feeler-type surface roughness measuring device (JIS B 0651), a light-wave interference-type surface roughness measuring device (JIS B 0652), a light cut-off surface roughness measuring device, etc. Any method can be selected as long as it is suited to the measurement specimen.

Examples of molding resins which can be used in this embodiment are as follows: polyethylene, polypropylene, polymethylpentene-1, polystyrene, ABS, polyamide, polycarbonate, polyphenylene oxide, polysulfone, polyarylate, polyethylene terephthalate, polybutylene terephthalate, polyphenylene sulfide, polyether sulfone, various thermoplastic polyimides, polyether ketone, polyethylnitrile, all thermoplastic resins such as thermotropic liquid-crystal polymer and all alloy resins in which the above-mentioned thermoplastic resins are blended.

(EXAMPLE 1)

A first example will now be described.

After a metal surface was provided with a satin finish by machining, several types of surface shapes of the metal part subjected to an anodized aluminum treatment were measured using the feeler-type surface roughness device at a measurement reference length L of 0.25 mm (this value was used throughout the following examples.). It was found that the values of Ra, $\Delta q$ and S fell within the following ranges: Ra=0.5~2.0 µm, $\Delta q$=5.0°~12.0°, S=20.0~50.0 µm.

The inner surface (molding surface) of a mold consisting of hot die steel was subjected to a blast treatment in such a manner that the surface shape of the mold fell within the above-mentioned ranges of values. The machining conditions for the blast treatment were as follows, using molten alumina as the blast material: abrasive grain size of #100; pneumatic pressure of 4 kg/cm$^2$; introduction rate of 20 kg/min. The inner surface of the mold was measured using the feeler-type surface roughness measuring device after the blast treatment and the values obtained were Ra=1.33 µm, $\Delta q$=9.00° and S=30.1 µm.

Figure 2:
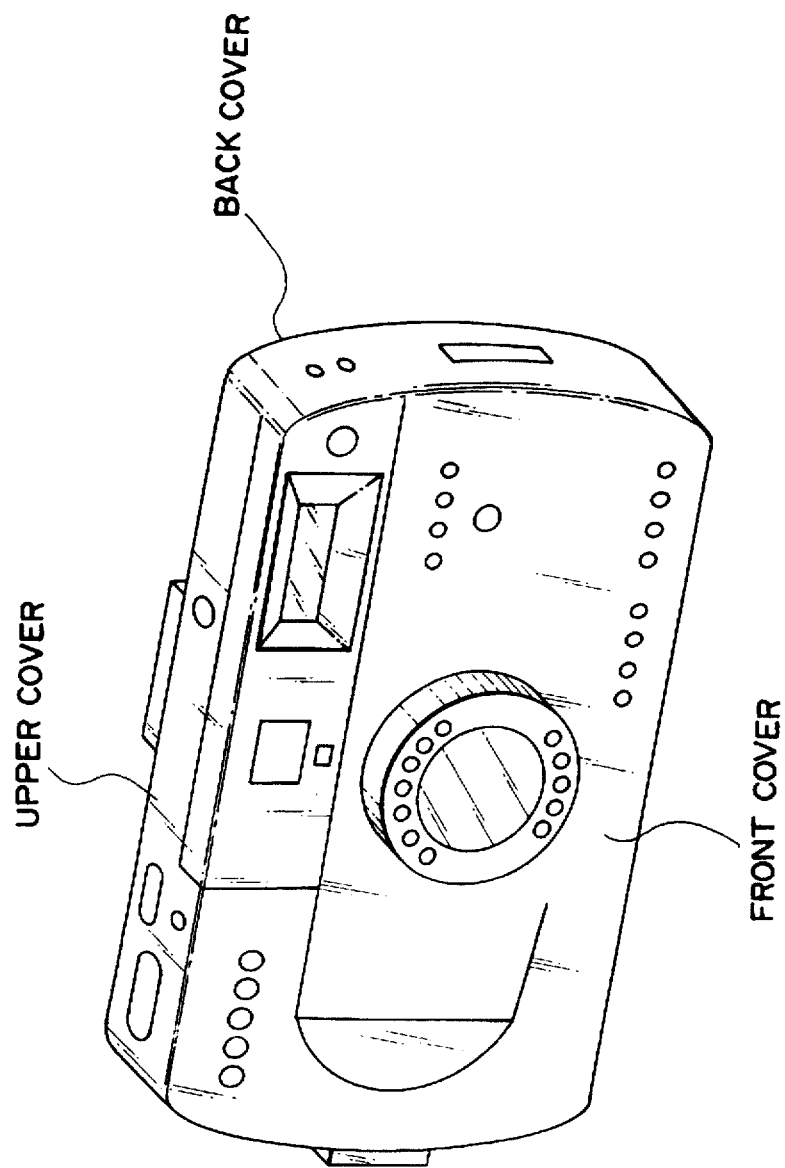
FIG. 2 is a perspective view showing a camera body in which a plastic molded article according to the invention is used.

Using a black ABS resin as the molding resin, a front cover serving as the trim part of a camera shown in FIG. 2 was molded by an injection molding machine having the above-described mold (see FIG. 1). The molding conditions were a resin temperature of 250° C., a molding pressure of 1000 kg/cm$^2$ and a mold temperature of 85° C.

The surface shape of the plastic molded article thus obtained was measured and the values determined were as follows: Ra=1.33 µm, $\Delta q$=8.45° and S=33.4 µm.

When the brilliance and gloss value of any metal subjected to the satin black anodized aluminum treatment and of the black molded plastic article were measured by the DR LANGE portable reflectometer and self-recording spectrophotometer, it was found that the measured values of the two were in very good agreement, as shown in FIG. 3.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the front cover of a camera, resembling well the metal surface subjected to the satin black anodized aluminum treatment was obtained. Further, similar results were obtained with regard to such trim parts as the top cover and back cover of a camera.

(EXAMPLE 2)

A second example will now be described.

The inner surface (molding surface) of a mold consisting of hot die steel was subjected to a blast treatment in such a manner that the surface shape of the mold fell within a range of values identical with that of the surface shape of the metal subjected to the anodized aluminum treatment. The machining conditions for the blast treatment were as follows, using molten alumina as the blast material: abrasive grain size of #220; pneumatic pressure of 4 kg/cm$^2$; introduction rate of 20 kg/min. The inner surface of the mold was measured using the feeler-type surface roughness measuring device after the blast treatment and the values obtained were Ra=0.58 µm, $\Delta q$=5.19° and S=12.4 µm.

Using a black ABS resin as the molding resin, a trim part of the camera shown in FIG. 2 was molded by an injection molding machine having the above-described mold (see FIG. 1). The molding conditions were a resin temperature of 250° C., a molding pressure of 1000 kg/cm$^2$ and a mold temperature of 85° C.

The surface shape of the plastic molded article thus obtained was measured and the values determined were as follows: Ra=0.58 µm, $\Delta q$=5.11° and S=13.4 µm.

Thus, whereas Ra, $\Delta q$ fell within a range the same as that of the metal subjected to the anodized aluminum treatment, the value of S was outside the above-mentioned range.

When the brilliance and gloss value of any metal subjected to the satin black anodized aluminum treatment and of the black molded plastic article were measured by the DR LANGE portable reflectometer and self-recording spectrophotometer, it was found that the measured values of the two were in very good agreement, as shown in FIG. 4.

With regard also to a visual observation (organoleptic evaluation, visual evaluation) of surface state, it was found that the two were similar in terms of the optical characteristics such as brightness and gloss received from the surface of the molded article. Thus, a black plastic molded article resembling well the metal surface subjected to the satin black anodized aluminum treatment was obtained.

7

(EXAMPLE 3)

A third example will now be described.

The inner surface (molding surface) of a mold consisting of hot die steel was subjected to a blast treatment in such a manner that the surface shape of the mold fell within a range of values identical with that of the surface shape of the metal subjected to the anodized aluminum treatment. The machining conditions for the blast treatment were as follows, using molten alumina as the blast material: abrasive grain size of #80; pneumatic pressure of 4 kg/cm$^2$; introduction rate of 20 kg/min. The inner surface of the mold was measured using the feeler-type surface roughness measuring device after the blast treatment and the values obtained were Ra=1.90 μm, Δq=12.66° and S=44.93 μm.

Using a gray ABS resin as the molding resin, a trim part of the camera shown in FIG. 2 was molded by an injection molding machine having the above-described mold (see FIG. 1). The molding conditions were a resin temperature of 250° C., a molding pressure of 1000 kg/cm$^2$ and a mold temperature of 85° C.

The surface shape of the plastic molded article thus obtained was measured and the values determined were as follows: Ra=1.88 μm, Δq=12.56° and S=44.5 μm.

Thus, whereas Ra, S fell within a range the same as that of the metal subjected to the anodized aluminum treatment, the value of Δq was outside the above-mentioned range.

When the brilliance and gloss value of any metal subjected to the satin gray anodized aluminum treatment and of the silver molded plastic article were measured by the DR LANGE portable reflectometer and self-recording spectrophotometer, it was found that the measured values of the two were in very good agreement, as shown in FIG. 5.

With regard also to a visual observation (organoleptic evaluation, visual evaluation) of surface state, it was found that the two were similar in terms of the optical characteristics such as brightness and gloss received from the surface of the molded article. Thus, a gray plastic molded article resembling the metal surface subjected to the satin gray anodized aluminum treatment was obtained.

(EXAMPLE 4)

A fourth example will now be described.

Several types of surface shapes of parts obtained by applying various coating treatments to the surface of a plastic molded article were measured under conditions identical with those of Example 1. It was found that the values of Ra, Δq and S fell within the following ranges: Ra=0.01~0.05 μm, Δq=1.0~10.0°, S=5.0~30.0 μm.

The inner surface (molding surface) of a mold consisting of hot die steel was subjected to a blast treatment in such a manner that the surface shape of the mold fell within the above-mentioned ranges of values. The machining conditions for the blast treatment were as follows, using glass bead as the blast material:

abrasive grain size of #325; pneumatic pressure of 2 kg/cm$^2$; introduction rate of 20 kg/min. The inner surface of the mold was measured using the feeler-type surface roughness measuring device after the blast treatment and the values obtained were Ra=0.19 μm, Δq =1.99° and S=20.9 μm.

Figure 6:
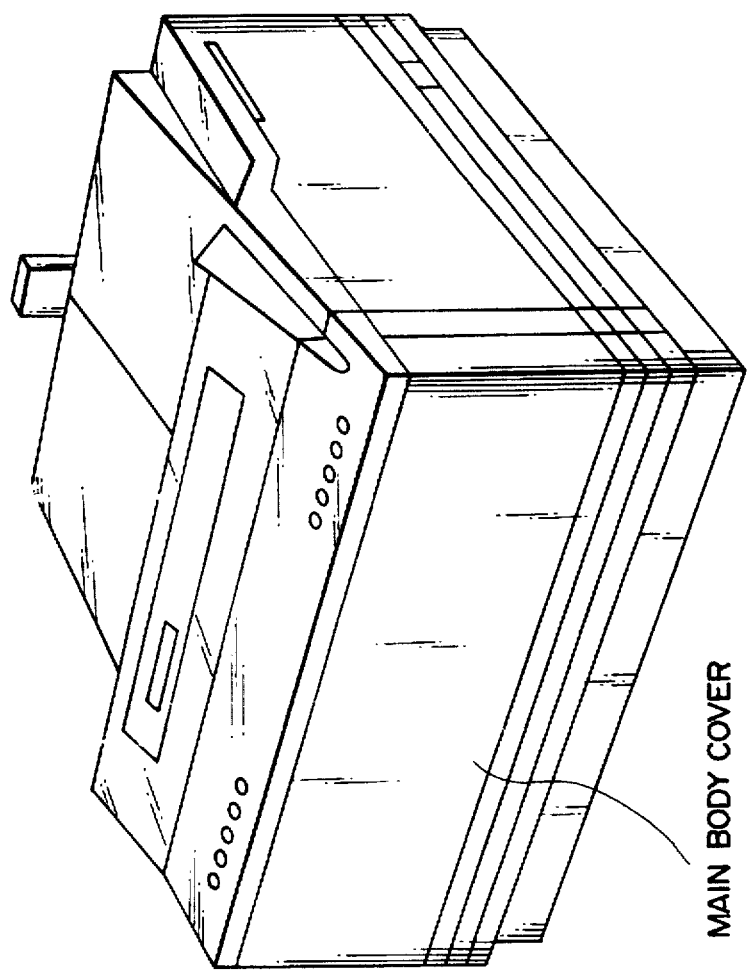
FIG. 6 is a perspective view showing a printer in which a plastic molded article according to the invention is used.

Using a black polycarbonate resin as the molding resin, a body cover serving as the trim part of a printer shown in FIG. 6 was molded by an injection molding machine having the above-described mold (see FIG. 1). The molding conditions were a resin temperature of 290° C., a molding pressure of 1000 kg/cm$^2$ and a mold temperature of 100° C.

8

The surface shape of the plastic molded article thus obtained was measured and the values determined were as follows: Ra=0.19 μm, Δq=1.71° and S=20.3 μm.

When the brilliance and gloss value of any plastic molded body subjected to the black coated treatment and of the black molded plastic article were measured by the DR LANGE portable reflectometer and self-recording spectrophotometer, it was found that the measured values of the two were in very good agreement, as shown in FIG. 7.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the body cover of a printer, resembling well the surface subjected to the black coating treatment was obtained.

(EXAMPLE 5)

An fifth example will now be described.

The inner surface (molding surface) of a mold consisting of hot die steel was subjected to a blast treatment in such a manner that the surface shape of the mold fell within a range of values identical with that of the surface shape of the plastic part subjected to the coating treatment. The machining conditions for the blast treatment were as follows, using glass bead as the blast material: abrasive grain size of #325; pneumatic pressure of 2 kg/cm$^2$; introduction rate of 30 kg/min. The inner surface of the mold was measured using the feeler-type surface roughness measuring device after the blast treatment and the values obtained were Ra=0.11 μm, Δq=1.26° and S=6.12 μm.

Using a black polycarbonate resin as the molding resin, a trim part of the printer shown in FIG. 6 was molded by an injection molding machine having the above-described mold (see FIG. 1). The molding conditions were a resin temperature of 290° C., a molding pressure of 1000 kg/cm$^2$ and a mold temperature of 100° C.

The surface shape of the plastic molded article thus obtained was measured and the values determined were as follows: Ra=0.11 μm, Δq=1.33° and S=6.21 μm.

Thus, whereas Ra, Δq fell within a range the same as that of the part subjected to the coating treatment, the value of S was outside the above-mentioned range.

When the brilliance and gloss value of any plastic molded article subjected to the black coating treatment and of the molded trim part of the printer were measured by the DR LANGE portable reflectometer and self-recording spectrophotometer, it was found that the measured values of the two were in very good agreement, as shown in FIG. 8.

With regard also to a visual observation (organoleptic evaluation, visual evaluation) of surface state, it was found that the two were similar in terms of the optical characteristics such as brightness and gloss received from the surface of the molded article. Thus, a black plastic molded article, for the trim part of a printer, resembling well the surface subjected to the black coating treatment was obtained.

(EXAMPLE 6)

A sixth example will now be described.

The inner surface (molding surface) of a mold consisting of hot die steel was subjected to a blast treatment in such a manner that the surface shape of the mold fell within a range of values identical with that of the surface shape of the plastic part subjected to the coating treatment. The machining conditions for the blast treatment were as follows, using glass bead as the blast material: abrasive grain size of #325; pneumatic pressure of 2 kg/cm$^2$; introduction rate of 10 kg/min. The inner surface of the mold was measured using the feeler-type surface roughness measuring device after the blast treatment and the values obtained were Ra=0.42 μm, Δq=14.53° and S=28.00 μm.

Using a gray polycarbonate resin as the molding resin, a trim part of the printer shown in FIG. 6 was molded by an injection molding machine having the above-described mold (see FIG. 1). The molding conditions were a resin temperature of 290° C., a molding pressure of 1000 kg/cm$^2$ and a mold temperature of 100° C.

The surface shape of the plastic molded article thus obtained was measured and the values determined were as follows: Ra=0.42 μm, Δq=14.46° and S=27.73 μm.

Thus, whereas Ra, S fell within a range the same as that of the part subjected to the coating treatment, the value of Δq was outside the above-mentioned range.

When the brilliance and gloss value of any plastic molded article subjected to the gray coating treatment and of the molded trim part of the printer were measured by the DR LANGE portable reflectometer and self-recording spectrophotometer, it was found that the measured values of the two were in very good agreement, as shown in FIG. 9.

With regard also to a visual observation (organoleptic evaluation, visual evaluation) of surface state, it was found that the two were similar in terms of the optical characteristics such as brightness and gloss received from the surface of the molded article. Thus, a gray plastic molded article, for the trim part of a printer, resembling the surface subjected to the gray coating treatment was obtained.

(EXAMPLE 7)

A seventh example will now be described.

Several types of surface shapes of parts obtained by applying various plating treatments to the surface of a plastic molded article and the surface of a metal were measured under conditions identical with those of Example 1. It was found that the values of Ra, Δq and S fell within the following ranges: Ra=0.01~0.1 μm, Δq=1.0~2.0°, S=5.0~15.0 μm.

The inner surface (molding surface) of a mold consisting of hot die steel was subjected to a blast treatment in such a manner that the surface shape of the mold fell within the above-mentioned ranges of values. The machining conditions for the blast treatment were as follows, using glass bead as the blast material: abrasive grain size of #440; pneumatic pressure of 2 kg/cm$^2$; introduction rate of 10 kg/min. The inner surface of the mold was measured using the feeler-type surface roughness measuring device after the blast treatment and the values obtained were Ra=0.068 μm, Δq =1.30° and S=9.44 μm.

Figure 10:
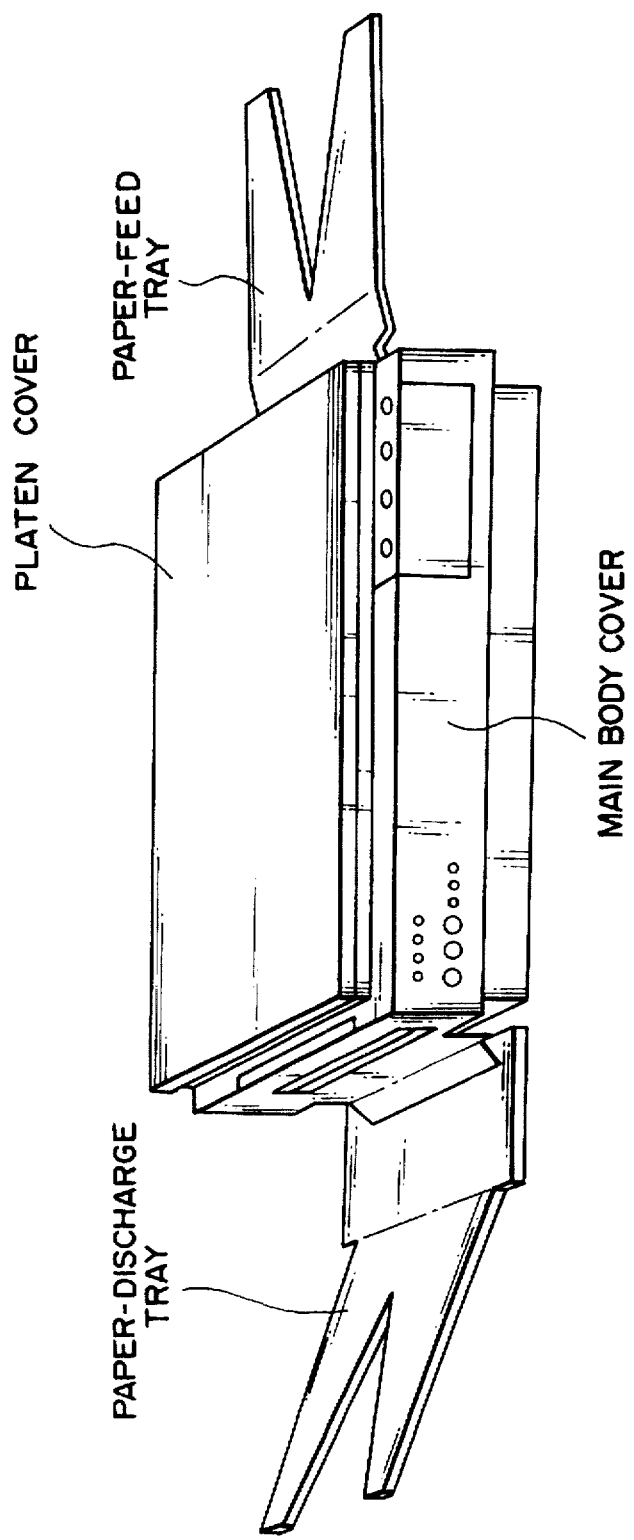
FIG. 10 is a perspective view showing a copier in which a plastic molded article according to the invention is used.

Using a black ABS resin as the molding resin, a trim part of a copier shown in FIG. 10 was molded by an injection molding machine having the above-described mold (see FIG. 1). The molding conditions were a resin temperature of 250° C., a molding pressure of 1000 kg/cm$^2$ and a mold temperature of 85° C.

The surface shape of the plastic molded article thus obtained was measured and the values determined were as follows: Ra=0.068 μm, Δq=1.25° and S=9.32 μm.

When the brilliance and gloss value of any plastic molded body subjected to the black plating treatment and of the molded trim part of the cover were measured by the DR LANGE portable reflectometer and self-recording spectrophotometer, it was found that the measured values of the two were in very good agreement, as shown in FIG. 11.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the trim part of a copier, resembling the surface subjected to the black plating treatment was obtained.

(EXAMPLE 8)

An eighth example will now be described.

The inner surface (molding surface) of a mold consisting of hot die steel was subjected to a blast treatment in such a manner that the surface shape of the mold fell within a range of values identical with that of the surface shape of the part subjected to the plating treatment. The machining conditions for the blast treatment were as follows, using glass bead as the blast material: abrasive grain size of #440; pneumatic pressure of 2 kg/cm$^2$; introduction rate of 20 kg/min. The inner surface of the mold was measured using the feeler-type surface roughness measuring device after the blast treatment and the values obtained were Ra=0.014 μm, Δq=1.28° and S=2.11 μm.

Using a black ABS resin as the molding resin, a body cover serving as the trim part of the copier shown in FIG. 10 was molded by an injection molding machine having the above-described mold (see FIG. 1). The molding conditions were a resin temperature of 250° C., a molding pressure of 1000 kg/cm$^2$ and a mold temperature of 85° C.

The surface shape of the plastic molded article thus obtained was measured and the values determined were as follows: Ra=0.013 μm, Δq=1.25° and S=2.46 μm.

Thus, whereas Ra, Δq fell within a range the same as that of the part subjected to the plating treatment, the value of S was outside the above-mentioned range.

When the brilliance and gloss value of any plastic molded article subjected to the black plating treatment and of the molded trim part of the copier were measured by the DR LANGE portable reflectometer and self-recording spectrophotometer, it was found that the measured values of the two were in good agreement, as shown in FIG. 12.

With regard also to a visual observation (organoleptic evaluation, visual evaluation) of surface state, it was found that the two were similar in terms of the optical characteristics such as brightness and gloss received from the surface of the molded article. Thus, a black plastic molded article, for body cover of a copier, resembling the surface subjected to the black plating treatment was obtained. Further, similar results were obtained with regard to such trim parts as a paper-feed tray, paper discharge tray and platen cover.

(EXAMPLE 9)

A ninth example will now be described.

The inner surface (molding surface) of a mold consisting of hot die steel was subjected to a blast treatment in such a manner that the surface shape of the mold fell within a range of values identical with that of the surface shape of the plastic part subjected to the plating treatment. The machining conditions for the blast treatment were as follows, using glass bead as the blast material: abrasive grain size of #440; pneumatic pressure of 2 kg/cm$^2$; introduction rate of 5 kg/min. The inner surface of the mold was measured using the feeler-type surface roughness measuring device after the blast treatment and the values obtained were Ra=0.092 μm, Δq=0.89° and S=6.45 μm.

Using a gray ABS resin as the molding resin, a trim part of the copier shown in FIG. 10 was molded by an injection molding machine having the above-described mold (see FIG. 1). The molding conditions were a resin temperature of 250° C., a molding pressure of 1000 kg/cm² and a mold temperature of 85° C.

The surface shape of the plastic molded article thus obtained was measured and the values determined were as follows: Ra=0.094 μm, Δq=0.93° and S=6.55 μm.

Thus, whereas Ra, S fell within a range the same as that of the part subjected to the plating treatment, the value of Δq was outside the above-mentioned range.

When the brilliance and gloss value of any plastic molded article subjected to the silver coating treatment and of the molded trim part of the copier were measured by the portable reflectometer and self-recording spectrophotometer, it was found that the measured values of the two were in good agreement, as shown in FIG. 13.

With regard also to a visual observation (organoleptic evaluation, visual evaluation) of surface state, it was found that the two were similar in terms of the optical characteristics such as brightness and gloss received from the surface of the molded article. Thus, a gray plastic molded article, for the trim part of a copier, resembling the surface subjected to the gray plating treatment was obtained.

(EXAMPLE 10)

A tenth example will now be described.

There are various methods of applying a coating treatment to a metal and plastic surfaces. These include lacquer satin coating, lacquer coating, crepe coating, leather tone coating, hammer tone coating, metallic coating, etc.

When the surface shape (surface roughness) of an external surface subjected to such a coating treatment was measured under conditions already described, it was found that the center-line average roughness Ra, the average slope Δq and the average peak-to-peak interval S were less than 0.5 μm, 1.0–10.0° and 5.0–30.0 μm, respectively.

Among the external surfaces subjected to the above-mentioned coating treatment, one was obtained by spray-coating an ABS resin plate with an acrylic resin paint following the admixing of a small amount of aluminum powder (method of coating treatment: metallic coating). The surface shape of the obtained plate was Ra=0.20 μm, Δq=2.10° and S=6.88 μm.

In order to mold an external appearance which resembles this resin plate thus coated, the inner surface (molding surface) of a mold consisting of hot die steel was subjected to a blast treatment in such a manner that Ra, Δq of this surface took on numerical values substantially the same as those mentioned above. The machining conditions for the blast treatment were as follows, using glass bead as the blast material: abrasive grain size of #325; pneumatic pressure of 2 kg/cm²; introduction rate of 20 kg/min. The surface shape of the inner surface of the mold was measured after the blast treatment and the values obtained were Ra=0.19 μm, Δq=1.99° and S=3.91 μm.

Using a black polycarbonate resin as the molding resin, upper cover of the camera shown in FIG. 6 was molded by an injection molding machine having the above-described mold. The injection molding machine used was of the ordinary type illustrated in FIG. 1. The molding conditions were a resin temperature of 290° C., a molding pressure of 1000 kg/cm² and a mold temperature of 100° C.

The surface shape of the upper cover of the camera thus obtained was measured and the values determined were as follows: Ra=0.19 μm, Δq=1.71° and S=3.56 μm.

Thus, a comparison of the coated plastic plate with the plastic molded article obtained shows that, with regard to the surface shape, the two are approximately the same in terms of Ra and Δq. However, it is difficult to say that they are approximately the same in terms of the value of S.

When the brilliance and gloss value of the plastic plate subjected to the black metallic coating treatment and of the molded black plastic article were measured by the DR LANGE portable reflectometer and self-recording spectrophotometer, it was found that the measured values of the two were in very good agreement, as shown in FIG. 14.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the upper cover of a camera, similar to the surface subjected to the black coating treatment was obtained.

(EXAMPLE 11)

An 11th example will now be described.

An aluminum metal plate was subjected to a black coating treatment using a two-pack polyurethane resin paint (method of coating treatment: plain coating). The surface shape of the obtained plate was Ra=0.33 μm, Δq=8.10° and S=26.4 μm.

In order to mold an external appearance which resembles this aluminum metal plate thus coated, the inner surface (molding surface) of a mold consisting of hot die steel was subjected to a blast treatment in such a manner that Ra, S of this surface took on numerical values substantially the same as those mentioned above. The machining conditions for the blast treatment were as follows, using glass bead as the blast material: abrasive grain size of #325; pneumatic pressure of 2 kg/cm²; introduction rate of 30 kg/min. The surface shape of the inner surface of the mold was measured after the blast treatment and the values obtained were Ra=0.31 μm, Δq=15.4° and S=25.4 μm.

Using a black polycarbonate resin as the molding resin, the upper cover of the camera shown in FIG. 2 was molded by an injection molding machine having the above-described mold. The injection molding machine used was of the ordinary type illustrated in FIG. 1. The molding conditions were a resin temperature of 290° C., a molding pressure of 1000 kg/cm² and a mold temperature of 100° C.

The surface shape of the upper cover of the camera thus obtained was measured and the values determined were as follows: Ra=0.29 μm, Δq=16.2° and S=24.8 μm.

Thus, a comparison of the coated metal plate with the plastic molded article obtained shows that, with regard to surface shape, the two are approximately the same in terms of Ra and S. However, it is difficult to say that they are approximately the same in terms of the value of Δq.

When the brilliance and gloss value of the metal plate subjected to the coating treatment and of the molded black plastic article were measured by the DR LANGE portable reflectometer and self-recording spectrophotometer, it was found that the measured values of the two were in very good agreement, as shown in FIG. 15.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the upper cover of a camera, similar to the surface subjected to the black coating treatment was obtained.

(EXAMPLE 12)

A 12th example will now be described.

A polycarbonate plate was annealed at 120° C. for 1 hr, after which it was subjected to a black coating treatment using a two-pack epoxy resin paint of a type effective at ordinary temperatures (method of coating treatment: plain coating). The surface shape of the obtained plate was Ra=0.24 μm, Δq=5.11° and S=15.5 μm.

In order to mold an external appearance which resembles this carbonate plate thus coated, the inner surface (molding surface) of a mold consisting of hot die steel was subjected to a blast treatment in such a manner that Ra, Δq and S of this surface took on numerical values substantially the same as those mentioned above. The machining conditions for the blast treatment were as follows, using glass bead as the blast material: abrasive grain size of #325; pneumatic pressure of 2 kg/cm², introduction rate of 25 kg/min.

The surface shape of the inner surface of the mold was measured after the blast treatment and the values obtained were Ra=0.23 μm, Δq=5.18° and S=16.2 μm.

Using a black polycarbonate resin as the molding resin, the upper cover of the camera shown in FIG. 2 was molded by an injection molding machine having the above-described mold. The injection molding machine used was of the ordinary type illustrated in FIG. 1. The molding conditions were a resin temperature of 290° C., a molding pressure of 1000 kg/cm² and a mold temperature of 100° C.

The surface shape of the upper cover of the camera thus obtained was measured and the values determined were as follows: Ra=0.25 μm, Δq=5.02° and S=15.9 μm.

Thus, a comparison of the coated plastic plate with the plastic molded article obtained shows that, with regard to surface shape, the two are approximately the same in terms of Ra, Δq and S.

When the brilliance and gloss value of the plastic plate subjected to the coating treatment and of the molded black plastic article were measured by the DR LANGE portable reflectometer and self-recording spectrophotometer, it was found that the measured values of the two were in very good agreement, as shown in FIG. 16.

With regard also to a visual observation (organoleptic evaluation, visual evaluation) of surface state, it was found that the two were very similar in terms of the optical characteristics such as brightness and gloss received from the surface of the molded article. Thus, a black plastic molded article, for the upper cover of a camera, similar to the surface subjected to the black coating treatment was obtained.

(EXAMPLE 13)

A 13th example will now be described.

The inner surface (molding surface) of a mold consisting of hot die steel was subjected to a blast treatment in such a manner that Ra, Δq and S of this surface took on numerical values of less than 0.5 μm, 1.0°~10.0° and 5.0~30.0 μm, respectively. The machining conditions for the blast treatment were as follows, using molten aluminum as the blast material: abrasive grain size of #100; pneumatic pressure of 4 kg/cm²; introduction rate of 30 kg/min. The surface shape of the inner surface of the mold was measured after the blast treatment and the values obtained were Ra=0.33 μm, Δq=3.25° and S=10.9 μm.

Using gray ABS resin as the molding resin, the trim part of the printer shown in FIG. 6 was molded by an injection molding machine having the above-described mold. The injection molding machine used was of the ordinary type illustrated in FIG. 1. The molding conditions were a resin temperature of 250° C., a molding pressure of 1000 kg/cm² and a mold temperature of 85° C.

The surface shape of the trim part of the printer thus obtained was measured and the values determined were as follows: Ra=0.35 μm, Δq=3.33° and S=9.69 μm.

When the brilliance and gloss value of this molded gray plastic article were measured by the DR LANGE portable reflectometer and self-recording spectrophotometer, it was found that the 85° specular gloss value was 63%.

With regard also to a visual observation (organoleptic evaluation, visual evaluation) of surface state, it was found that this plastic molded article was very similar to the surface subjected to the gray coating treatment.

Thus, according to these examples, as described above, in order to obtain a plastic molded article, having an external appearance equivalent to that which would be obtained by applying a coating treatment, merely by molding without application of any particular post-treatment, the following is carried out:

(1) The 85° specular gloss value of the plastic molded article is made greater than 40% and less than 80%. The value of 40~80% has been determined on the basis of the fact that 40~80% is the range obtained as the result of measuring the gloss values of the black-coated surfaces of a single-lens reflex cameras manufactured and sold by the applicant in the past.

(2) It is so arranged that the center-line average roughness Ra and average slope Δq of the surface shape (surface roughness) of the obtained plastic molded article fall within the ranges of less than 0.5 μm and 1.0°~10.0°, respectively.

(3) It is so arranged that the center-line average roughness Ra and average peak-to-peak interval S of the surface shape (surface roughness) of the obtained plastic molded article fall within the ranges of less than 0.5 μm and 5.0~30.0 μm, respectively.

(4) It is so arranged that the center-line average roughness Ra, average slope Δq and average peak-to-peak interval S of the surface shape (surface roughness) of the obtained plastic molded article fall within the ranges of less than 0.5 μum, 1.0~10.0° and 5.0~30.0 μm, respectively.

By performing molding in this manner, there is obtained an external surface approximately equivalent to that which would be obtained by application of a coating treatment even in terms of the mechanical spectral characteristic and, moreover, even in terms of organoleptic (visual) evaluation.

Accordingly, it is possible to obtain, without any special post-treatment, a plastic molded article whose external look appears as though it were the result of a high-quality coating treatment. This makes it possible to lower the cost of the article.

Further, in accordance with the foregoing examples, it is so arranged that the surface shape (surface roughness) of a solid substance having a desired external surface and the surface shape (surface roughness) of a plastic molded article obtained by an injection molding process become approximately identical in terms of at least two values from among the center-line average roughness Ra, average slope Δq and average peak-to-peak interval S (in which Ra is included among these at least two values). As a result, there is obtained an external surface approximately equivalent to that which would be obtained by application of a coating treatment even in terms of the mechanical spectral characteristic and, moreover, even in terms of organoleptic (visual) evaluation. Further, it is so arranged that the surface shape (surface roughness) of a plastic molded article obtained by an injection molding process falls within the ranges shown in FIG. 18 in terms of at least two values from among numerical values corresponding to Ra, Δq and S (in which Ra is included among these at least two numerical values). As a result, there is obtained, neatly, easily and inexpensively, a plastic molded article having a desired high-quality external appearance that seems to have been acquired by a satin anodized aluminum treatment, coating treatment, plating treatment, etc.

(EXAMPLE 14)

Before describing the 14th example, the effects of article surface roughness and gloss, etc., on external appearance will be discussed, though this has already been covered in part earlier.

First, center-line average roughness Ra will be described with regard to its influence upon the quality of external appearance.

Figure 19:
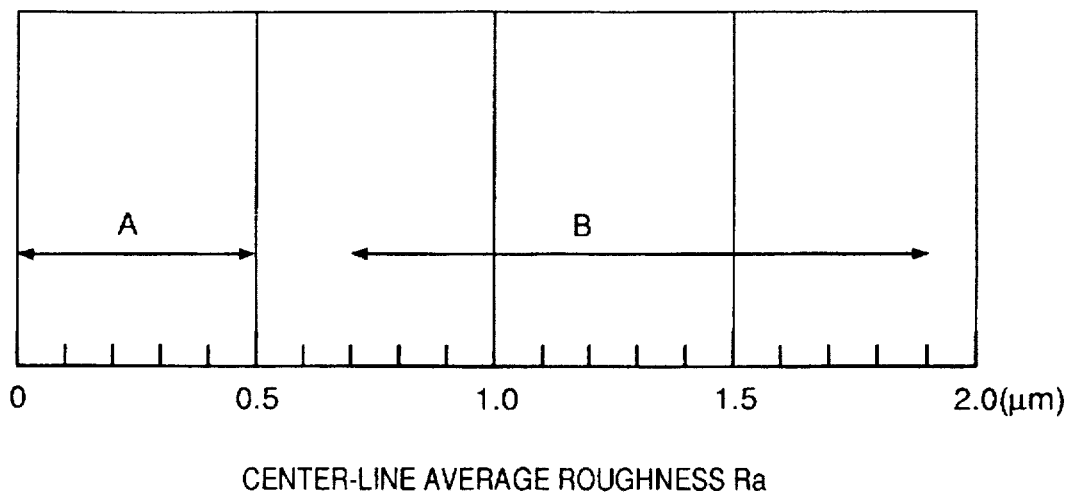
FIG. 19 is a diagram showing the relationship between a method of working an external surface and average roughness Ra along a center line.

FIG. 19 illustrates types of external surface machining methods and the range of Ra corresponding to each machining method. In FIG. 19, Ra is plotted along the horizontal axis, the area A represents an external surface that has been subjected to a coating treatment, and the area B represents a satin anodized aluminum external surface obtained by subjecting an aluminum alloy to a honing treatment and anodized aluminum treatment. In this example, Ra=0.23 μm (the details will be described later), and the surface state implemented is that of area A (coating treatment).

One surface shape factor directly related in terms of obtaining an impression of uniformity and an impression of denseness is the pitch of irregular patterns in the surface shape constituting the external surface. In order to express the sensation of "denseness", an important condition is that the pitch of the irregularities be small.

In this example, the surface shape is composed of overlapping circles having an equivalent radius of less than 25 μm or a diameter of less than 50 μm. Consequently, the peak-to-peak pitch of the surface becomes much smaller than 50 μm. When the average peak-to-peak interval S of this example was measured, S=21 μm was obtained (the details will be described later). Furthermore, when the peak-to-peak interval S of an external part that has been subjected to a coating treatment was measured, S was found to range from 5 to 30 μm. It was clarified that S in this example fell within the range of S obtained by the coating treatment.

Figure 20:
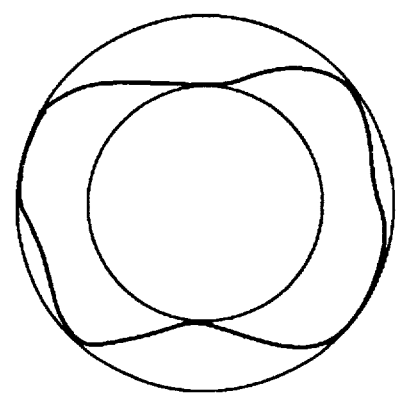
FIG. 20 is a diagram for describing equivalent radius.

The "equivalent radius" mentioned above is a parameter representing the size of a figure which is not a true circle. When true circularity is obtained in accordance with the definition of "true circularity" in ISO 1101 (JIS B 0621), "equivalent radius" indicates the average value of the radii of two concentric circles in a case where the spacing between the two concentric circles, which bracket the figure, is minimized. FIG. 20 illustrates such an example. The difference between the radii of the two concentric circles shown in FIG. 20 is the true circularity. The average radius of the two concentric circles is the equivalent radius.

The influence of gloss upon the quality of external appearance will be described next.

Figure 21:
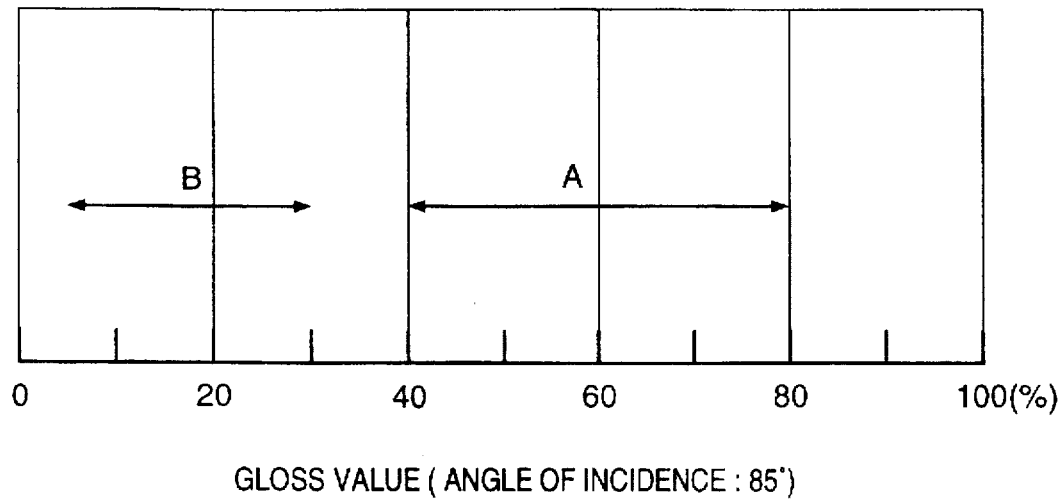
FIG. 21 is a diagram showing the relationship between a method of working an external surface and gloss value.

FIG. 21 illustrates types of external surface machining methods and the range of gloss value corresponding to each machining method. In FIG. 21, the gloss value is plotted along the horizontal axis, the area A represents an external surface that has been subjected to a coating treatment, and the area B represents a satin anodized aluminum external surface obtained by subjecting an aluminum alloy to a honing treatment and anodized aluminum treatment. In this example, the gloss value is 57% (the details will be described later), and the gloss value implemented is that of area A (coating treatment).

The 14th example will now be described.

Figure 22:
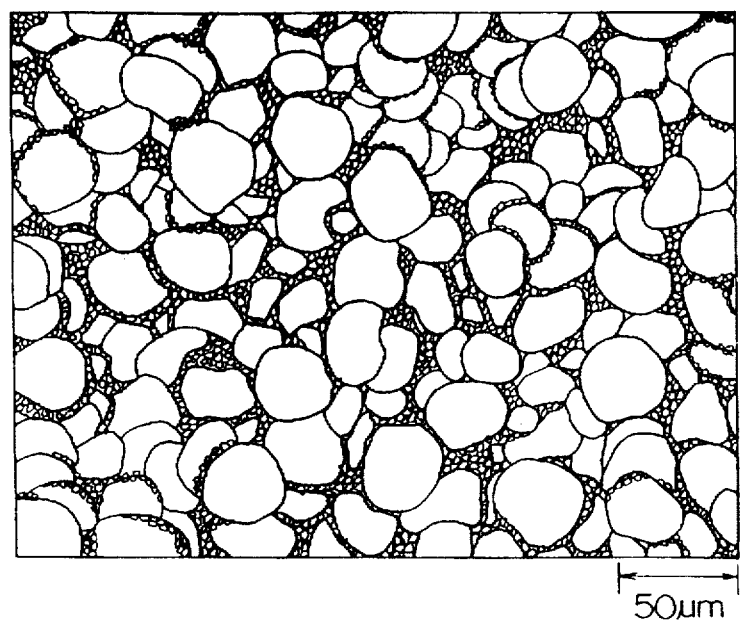
FIG. 22 is a reproduction of a microphotograph showing the external surface of a plastic molded article according to a 14th example.

FIG. 22 is a reproduction of a microphotograph showing the external surface of a plastic molded article according to the 14th example. The equivalent radius of a circular pattern formed by transferring the recesses of the mold surface was 12–20 μm. As for the true circularity of the individual circular patterns, the equivalent radius of each circular pattern ranged from 10 to 40% in most circular patterns, but on rare occasions true circularity was observed in which the equivalent radius of 40% was exceeded. Flaws different from the circular patterns were observed between circular patterns. Then, the proportion of surface area occupied by circular patterns was measured from a microphotograph and 91.6% was obtained, when the true circularity of the circular patterns was less than 40% of the equivalent radius of the circular patterns.

When center-line average roughness Ra of this external surface was measured, Ra=0.23 μm was obtained. When the average peak-to-peak interval S and gloss value were measured, S=21 μm and 57% (angle of incidence 85°) were obtained.

The above-mentioned results of measurement indicate that a surface shape and external appearance which could be realized only by a coating treatment in the prior art could be achieved in this example.

When the external appearance of this plastic part was visually evaluated by an industrial designer, the result of the evaluation was that there were no appearance-related problems caused by a variance in the circular patterns and that an impression of uniformity and denseness not seen in the appearance of the conventional plastic part were obtained. Thus an improvement in the external quality of the part was confirmed.

A procedure through which this plastic part was fabricated will now be described.

Powder electrical discharge machining was carried out in order to continuously form circular recesses on a surface corresponding to the external surface (molding surface) of a frame constructing the cavity of a mold.

As described in "Tool Engineer", pp. 76–81, March, 1993 and in "Die & Mould Technology", Vol. 8, No. 3, pp. 69–73 (March, 1993), powder electrical discharge machining is special electrical discharge machining in which a mirror surface is obtained by electrical discharge machining. This technique was developed for the purpose of rationalizing molding machining by eliminating a mold polishing operation which inevitably relies upon human labor. Such machines have recently begun being sold by the makers of electrical discharge machines.

Figure 23:
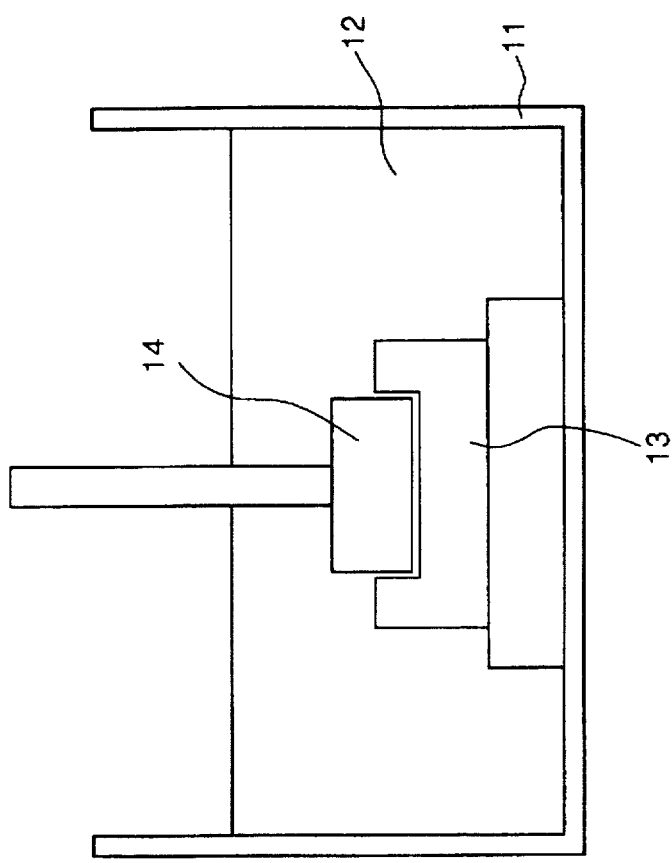
FIG. 23 is a schematic view showing an electrical discharge machining apparatus.

FIG. 23 is a schematic view of such an electrical discharge machine. A machining solution 12 is accommodated within a machining tank 11. A member 13 constituting the cavity of a mold and a discharge electrode 14 which machines a surface corresponding to the external surface (molding surface) of the member 13 are placed within the machining solution 12.

Powder electrical discharge machining uses a machining solution in which a powder of silicon or the like is mixed and therefore differs from ordinary electrical discharge machining, which uses oil as the machining solution. The mark left by each individual discharge is substantially circular. Accordingly, the surface of a mold can be machined to have the surface shape of this example by performing powder electrical discharge machining to form numerous discharge marks, namely generally circular recesses, in the surface of the mold. In this example, the electrical discharge machining conditions were adjusted in such a manner that the electrical discharge marks became small in size, though this was at the expense of the mirror surface machining performance which is the original purpose of powder electrical discharge machining.

The material used for the mold was SKD 61, and the material used for the electrode was copper. The machined surface area was 12 cm², and the final finishing conditions of powder electrical discharge machining were IP 1A, an ON time of 2 µs, an OFF time of 2 µs, minus (−) polarity, a load voltage of 90 V, and capacitor OFF. Machining time was 50 min.

After the completion of powder electrical discharge machining, a plastic part was molded by injection molding using a mold incorporating this frame. By employing an injection molding machine manufactured by Sumitomo Heavy Industries, using Panlite M3000L (black) manufactured by Teijin Chemicals as the resin material and performing molding under conditions of a mold temperature of 120° C., an injection cylinder temperature of 270° C. and an injection pressure of 70 MPa, a plastic part having the surface shape shown in FIG. 22 was obtained.

FIG. 24 illustrates the surface roughness, brilliance and gloss value of a part surface that was subjected to a coating treatment, a metal surface and a surface of a molded plastic part.

(EXAMPLE 15)

Figure 25:
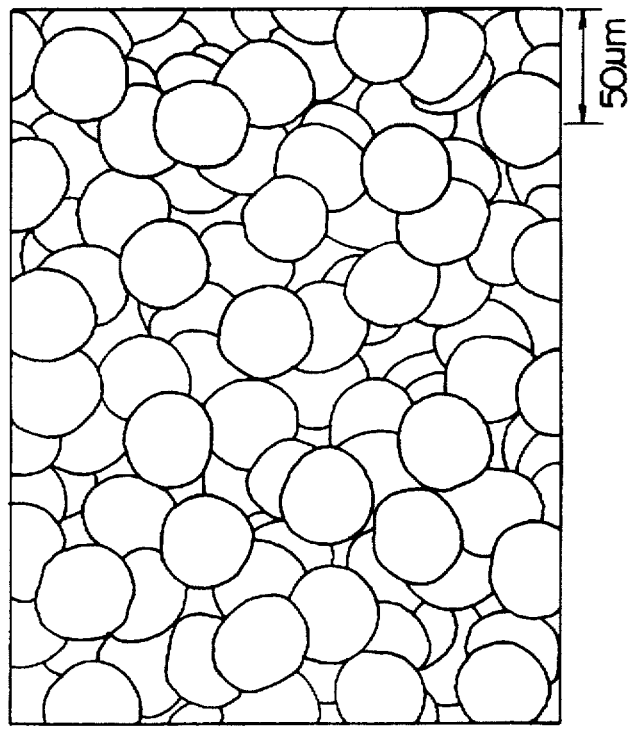
FIG. 25 is a reproduction of a microphotograph showing the external surface of a plastic molded article according to a 15th example.

FIG. 25 is a reproduction of a microphotograph showing the external surface of a plastic molded article according to the 15th example. The equivalent radius of a circular pattern formed by transferring the recesses of the mold surface was 20~21 µm. The true circularity of the circular patterns was less than 10% of the equivalent radius of each circular pattern in all circular patterns.

Furthermore, when center-line average roughness Ra of this external surface was measured under conditions identical to those mentioned above, Ra=0.43 µm was obtained. When the average peak-to-peak interval S and gloss value were measured, S=27 µm and 48% (angle of incidence 85°) were obtained.

The above-mentioned results of measurement indicate that a surface shape and external appearance which could be realized only by a coating treatment in the prior art could be achieved in this example.

When the external appearance of this plastic part was visually evaluated by an industrial designer, the result of the evaluation was that an impression of uniformity and denseness not seen in the appearance of the conventional plastic part were obtained. Thus an improvement in the external quality of the part was confirmed.

A procedure through which this plastic part was fabricated will now be described.

A surface corresponding to the external surface (molding surface) of a frame (mold member 6) constructing the cavity of a mold was repeatedly irradiated with a laser beam to create a surface shape of overlapped recesses.

Figure 26:
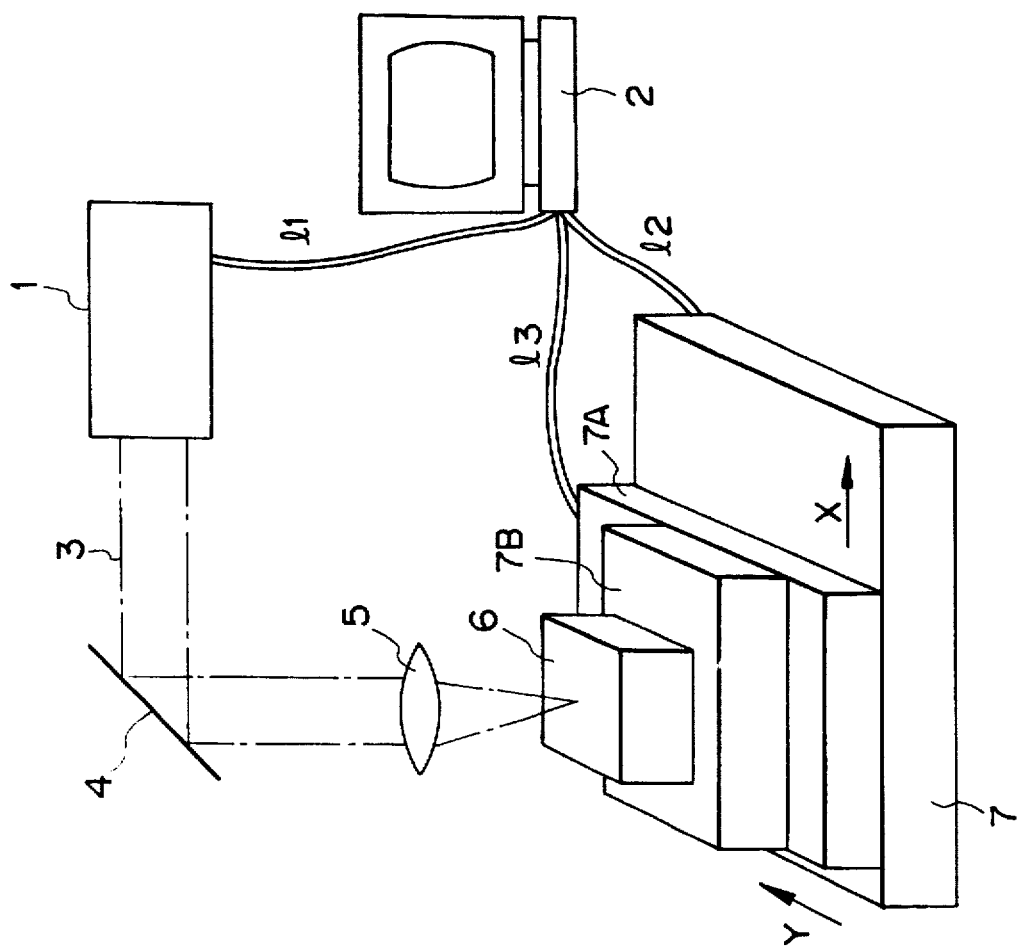
FIG. 26 is a diagram showing the construction of a laser machining system.

FIG. 26 is a diagram showing the configuration of a laser machining system used in this machining. In FIG. 26, numeral 1 denotes a laser beam source which, in this example, was a YAG laser. The laser beam source 1 has its lasing pulse frequency and pulse output decided by a signal from a controller 2. Also applied is a signal which decides lasing time.

Numeral 3 denotes a laser beam produced by the laser beam source 1 The laser beam 3 is reflected by a reflecting mirror 4 and its energy is focused on the mold member 6 by a condenser lens 5.

The mold member 6 is retained on a stage 7 movable in X and Y directions indicated by the arrows. A portion 7A of the stage 7 movable in the X direction is moved back and forth in the X direction by moving means (a motor), which is not shown. A portion 7B of the stage 7 movable in the Y direction is held on the X-direction movable portion 7A and is moved back and forth in the Y direction by moving means (a motor), which is not shown. Thus, the mold member 6 is capable of being moved back and forth in the X and Y directions with respect to the position irradiated by the laser.

Numerals 11, 12 and 13 designate signal lines.

A procedure carried out to machine a planar portion corresponding to the external surface of a molded part of the mold member 6 made of SKD61 will now be described in detail. In this example, machining was applied to a planar surface of 25×20 mm.

The mold member 6 was secured to the movable stage 7 in such a manner that the planar portion to undergo machining was made parallel to an X-Y plane defined by the directions of movement of the movable stage 7. The external surface of the mold member 6 was polished in advance to have a surface roughness Rmax of less than 0.3 µm.

The YAG laser source 1 used had an output value of more than 5 W and a pulse output of 1~5 kHz.

The following conditions were entered into the controller 2:

Laser power: 8 W; pulse output: 1 kHz; speed of movable stage in X direction: 20 mm/sec; speed of movable stage in Y direction: 50 mm/sec. The traveling distance of the movable stage was made 45 mm in the X direction and 40 mm in the Y direction, obtained by adding 10 mm on one side, as an interval for acceleration and deceleration of the movable stage, to the X dimension of 25 mm and Y dimension of 20 mm of the plane subjected to machining. Back-and-forth movement was continuously repeated in the X and Y directions simultaneously over this range, and the laser beam was outputted for a length of time needed for the irradiated position to pass through the machining area of 25×20 mm at a substantially equal speed.

The controller 2 produces the laser control signal in dependence upon the movement of the mold member 6, and the laser source 1 delivers the laser beam 3 at a pulse output of 1 kHz. The laser beam 3 irradiates the mold member 6 via the reflecting mirror 4 and condensing lens 5.

Figure 27:
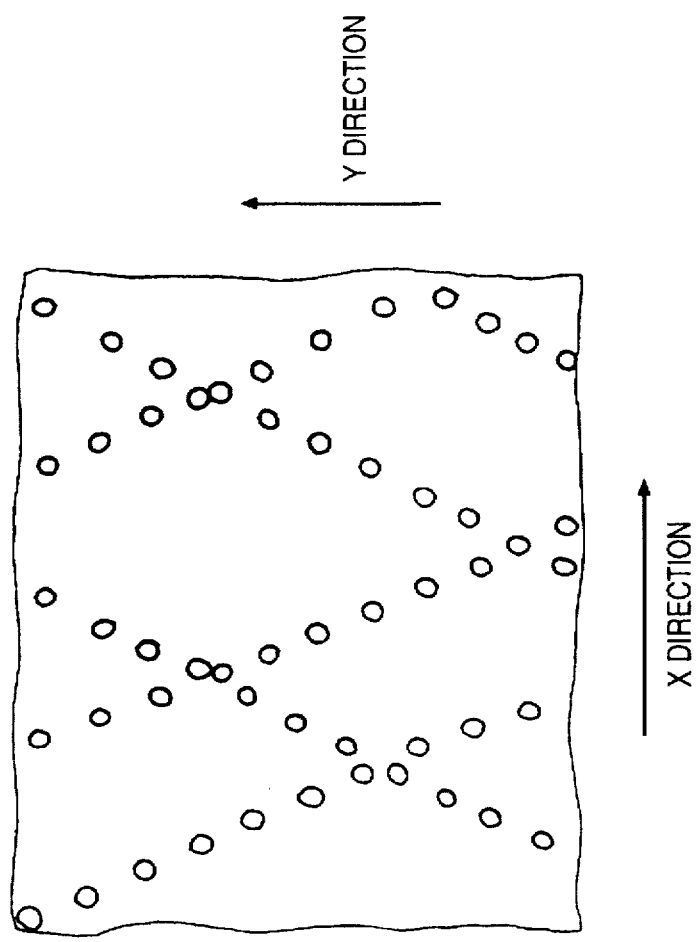
FIG. 27 is a diagram showing the surface state of a mold member during laser machining.

The mold member 6 is moved back and forth at different speeds in the X and Y directions, and the laser beam is intermittent pulsed light. As a result, intermittent circular recesses of the kind shown in FIG. 27 are formed in the surface of the mold member 6.

The foregoing operation is repeated to intermittently irradiate the entirety of the target external machining surface of the mold member 6, thereby forming numerous recesses, namely circular depressions, to create the surface shape of this example.

After laser-beam machining was performed for 300 min under the set conditions mentioned above, a plastic part was molded by injection molding using a mold incorporating this frame. By employing an injection molding machine manufactured by Sumitomo Heavy Industries, using Panlite M3000L (black) manufactured by Teijin Chemicals as the resin material and performing molding under conditions of a mold temperature of 120° C., an injection cylinder temperature of 270° C. and an injection pressure of 70 MPa, a plastic part having the surface shape shown in FIG. 25 was obtained.

FIG. 28 illustrates the surface roughness, brilliance and gloss value of a part surface that was subjected to a coating treatment, a metal surface and a surface of a molded plastic part.

With the machining apparatus used in this example, only a planar portion can be machined. However, it will be possible to machine external surfaces having all kinds of shapes if a laser machining apparatus in which the position at which the laser beam is focused and the direction of irradiation are capable of being changed continuously is manufactured by improving on the laser optical system and mold member moving device in such a manner that the laser beam is focused and projected upon the surface of the mold cavity in the perpendicular direction in dependence upon the shape of the mold cavity.

Thus, in accordance with these examples as described above, a plastic part whose surface has irregularities at a pitch finer than that of the prior art can be obtained by forming the plastic part using a mold whose surface is formed to have numerous machining traces in the shapes of recesses having a radius of less than 25 µm. This makes it possible to provide a plastic part having a high-quality external appearance.

As for improving the quality of the external appearance of the plastic part, it was verified that good effects are obtained if small circular patterns in which the true circularity is less than 40% of the equivalent radius occupy a surface area of more than 90% of the surface of the plastic part.

It should be noted that the invention can be modified in various ways without departing from the scope of the claims.

For example, in the above example a case is described in which Panlite M3000L manufactured by Teijin Chemicals is used as the resin material. However, other resin materials such as ABS, PC, PPO, PP and PE, alloys thereof and mixtures thereof with glass or metal also can be used.

Further, though a case has been described in which a part is molded by injection molding, it is permissible to perform molding by compression molding, vacuum molding and blow molding, etc.

Further, a case has been described in which the plastic part of the invention is used as an external portion of a manufactured article. However, by preparing the surface of a plastic part in the manner of the foregoing example, it is possible to control the wettability and coefficient of friction, etc., of a material. The plastic part of the present invention is not limited to external use.

As set forth above, the plastic molded part of these examples are characterized in that the 85° specular gloss value of the surface thereof is made greater than 40% and less than 80% and, among the three parameters of center-line average roughness Ra, average slope Δq and peak-to-peak interval S, the values of at least two of these parameters (in which Ra is included among these at least two values) are made to fall within the above-mentioned ranges of numerical values, as a result of which there can be obtained a plastic molded part having an external appearance approximately equivalent to that which would be obtained by application of a coating treatment in secondary machining, even in terms of the mechanical spectral characteristic and, moreover, even in terms of organoleptic (visual) evaluation. Accordingly, it is possible to obtain, without any special post-treatment, a plastic molded article having a high-quality external appearance (as though it were the result of a coating treatment). This makes it possible to lower the cost of the article.

Further, a plastic part whose surface has irregularities at a pitch finer than that of the prior art can be obtained by forming the plastic part using a mold whose surface is formed to have numerous machining traces in the shapes of recesses having a radius of less than 25 µm. This makes it possible to provide a plastic part having a high-quality external appearance.

As for improving the quality of the external appearance of the plastic part, it was verified that good effects are obtained if small circular patterns in which the true circularity is less than 40% of the equivalent radius occupy a surface area of more than 90% of the surface of the plastic part.

The present invention is not limited to the above embodiments and various changes and modifications can be made within the spirit and scope of the present invention. Therefore, to apprise the public of the scope of the present invention, the following claims are made.

What is claimed is:

1. A plastic molded article having an external appearance of a coated article and formed by injection molding using a mold with a surface shaped by forming machining marks in the form of recesses over the entire mold surface, with each recess having a radius of less than 25 µm, comprising:

a plastic molded article having a surface shape of the mold surface, wherein the plastic molded article has a centerline average roughness Ra of the surface shape of the plastic molded article less than 0.5 µm and one of either an average slope Δq within the range of 1.0°–10.0° an average peak-to-peak interval S within the range of 5.0–30.0 µm, whereby an 85° specular gloss value of the molded article surface is greater than 40% and less than 80%, which is equivalent to a gloss value of the coated article surface.

2. The article according to claim 1, wherein a center-line average roughness Ra of the surface shape of said plastic molded article is less than 0.5 µm and an average peak-to-peak interval S falls within the range 5.0–30.0 µm.

3. The article according to claim 1, wherein said article is used as an external portion of a camera.

4. The article according to claim 1, wherein said molded article is used as an external portion of a portable manufactured article.

5. The article according to claim 1, wherein said molded article is used as an external portion of office automation equipment.

6. The article according to claim 1, wherein the machining marks formed in the mold surface are in the form of recesses and have a true circularity of less than 40% of the equivalent radius of each machining mark occupying more than 90% of the surface of the mold.

* * * * *

UNITED STATES PATENT AND TRADEMARK OFFICE
CERTIFICATE OF CORRECTION

PATENT NO. : 5,705,254
DATED : January 6, 1998
INVENTOR(S) : Morinaga et al.

It is certified that error appears in the above-identified patent and that said Letters Patent is hereby corrected as shown below:

COLUMN 14:

Line 49, "0.5μum," should read --0.5 μm,--.

COLUMN 20:

Line 43, "an" should read --or an--.

Signed and Sealed this

Eleventh Day of August 1998

Attest:

BRUCE LEHMAN

Attesting Officer    Commissioner of Patents and Trademarks